(12) United States Patent
Mitchell (10) Patent No.: US 9,150,164 B2
(45) Date of Patent: Oct. 6, 2015

(54) VEHICLE ENTERTAINMENT SYSTEM

(75) Inventor: Ciaran Mitchell, Surrey (GB)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 267 days.

(21) Appl. No.: 13/992,913

(22) PCT Filed: Dec. 14, 2011

(86) PCT No.: PCT/GB2011/001720
§ 371 (c)(1),
(2), (4) Date: Jun. 10, 2013

(87) PCT Pub. No.: WO2012/080699
PCT Pub. Date: Jun. 21, 2012

(65) Prior Publication Data
US 2013/0259261 A1    Oct. 3, 2013

(30) Foreign Application Priority Data

Dec. 14, 2010 (GB) .................................. 1021187.8

(51) Int. Cl.
*B60R 11/02* (2006.01)
*B60R 11/00* (2006.01)

(52) U.S. Cl.
CPC ......... *B60R 11/0205* (2013.01); *B60R 11/0235* (2013.01); *B60R 11/0252* (2013.01); *B60R 2011/0017* (2013.01); *B60R 2011/0087* (2013.01)

(58) Field of Classification Search
None
See application file for complete search history.

(56) References Cited

U.S. PATENT DOCUMENTS

| 5,177,616 | A | | 1/1993 | Riday | |
|---|---|---|---|---|---|
| 5,359,349 | A | * | 10/1994 | Jambor et al. | 345/168 |
| 5,673,628 | A | * | 10/1997 | Boos | 108/44 |
| 5,842,715 | A | * | 12/1998 | Jones | 280/727 |
| 6,186,459 | B1 | * | 2/2001 | Ma | 248/276.1 |
| 7,036,879 | B2 | * | 5/2006 | Chang | 297/217.3 |
| 7,044,546 | B2 | * | 5/2006 | Chang | 297/217.3 |
| 7,360,833 | B2 | * | 4/2008 | Vitito | 297/217.3 |

(Continued)

FOREIGN PATENT DOCUMENTS

| DE | 102005021105 A1 | 11/2006 |
|---|---|---|
| WO | 2008141217 A1 | 11/2008 |

OTHER PUBLICATIONS

International Search Report corresponding to PCT/GB2011/001720 dated mailed Mar. 16, 2012.

*Primary Examiner* — Brenda Bernardi
(74) *Attorney, Agent, or Firm* — F. Chau & Associates, LLC (57) ABSTRACT

A vehicle entertainment system (1) is adapted to be mounted to a vehicle. It has a mounting bracket (2) adapted for coupling to a dashboard of a vehicle, a vehicle seat, its headrest if present, or mounting posts for such a headrest, or into an arm-rest for a vehicle seat. A mounting arm (7) is mounted for rotation relative to the mounting bracket about a main axis (6) arranged in use to extend generally horizontally. A monitor unit (3) has a front side (5) and a rear side (29). The monitor unit has at least one structure enabling access to entertainment for a user. The structure may be at least one of a monitor screen on the front side, controls for an audio system on the front side, controls for an audio system on the rear side, and a slot (30) adapted for a tablet computer to dock therein both physically and electronically with the screen of the tablet computer (35) exposed on the rear side.

8 Claims, 12 Drawing Sheets

(56) References Cited

U.S. PATENT DOCUMENTS

| | | | |
|---|---|---|---|
| 7,401,853 B2* | 7/2008 | Boudinot | 297/217.4 |
| 7,591,508 B2* | 9/2009 | Chang | 297/217.3 |
| 7,762,627 B2* | 7/2010 | Chang | 297/217.3 |
| 7,780,231 B2* | 8/2010 | Shalam et al. | 297/217.3 |
| 7,791,586 B2* | 9/2010 | Shalam | 345/108 |
| 2004/0227861 A1* | 11/2004 | Schedivy | 348/837 |
| 2005/0200697 A1* | 9/2005 | Schedivy et al. | 348/61 |
| 2007/0108788 A1 | 5/2007 | Shalam et al. | |
| 2012/0033375 A1* | 2/2012 | Madonna et al. | 361/679.43 |

* cited by examiner

VEHICLE ENTERTAINMENT SYSTEM

FIELD OF THE DISCLOSURE

This disclosure relates to in vehicle entertainment systems.

BACKGROUND

Rear seat entertainment systems for cars (automobiles) are well known, and typically comprise a monitor with a monitor screen, the angle of which is often adjustable, mounted to the rear of a first seat for viewing by a passenger seated behind that first seat. The monitor may be mounted in the seat-back itself, in a headrest for that seat or otherwise mounted to the back of the seat or the back of the headrest or from posts mounting the headrest. The expression "mounted to the rear of a first seat" as used herein is intended to encompass all or any of these possibilities. Similar such entertainment systems are incorporated in the seat backs of aircraft passenger seats and in the seat-backs on some railway passenger seats and seats in long distance coach transport vehicles.

Audio entertainment and satellite navigation systems, sometimes combined, are also well known in motor vehicles, and typically have a monitor unit mounted in the vehicle dashboard. The monitor unit, in the case of a satellite navigation system will have a monitor screen. In the case of an audio system, the monitor unit will have controls therefor including one or more of press buttons, dials and/or a touchscreen. The term "mounted to a vehicle" in relation to vehicle entertainment systems is intended to encompass systems mounted in or from the vehicle dashboard as well as those that are mounted to the rear of a seat and also to encompass mounting to a seat-back of an aircraft, railway, passenger ship or long distance coach transport vehicle, and also systems that employ folding brackets that stow into an armrest of a vehicle.

SUMMARY OF THE DISCLOSURE

In a first aspect of this disclosure, there is provided a vehicle entertainment system adapted to be mounted to a vehicle, and comprising a mounting bracket adapted for coupling to one of a dashboard of a vehicle, a vehicle seat, its headrest if present, and mounting posts for such a headrest, and into an arm-rest for a vehicle seat; a mounting arm mounted for rotation relative to the mounting bracket about a main axis arranged in use to extend generally horizontally; a monitor unit, having a front side and a rear side; the monitor unit having at least one structure enabling access to entertainment for a user, the structure being selected from the group comprising at least one of a monitor screen on said front side, controls for an audio system on said front side, controls for an audio system on said rear side, and a slot adapted for a tablet computer to dock therein both physically and electronically with the screen of the tablet computer exposed on the rear side; and the monitor unit being mounted to the mounting arm for rotation with the mounting arm about the main axis for adjustment of the angle of presentation of its front or rear side to suit a user; the monitor unit being coupled to the mounting arm by a pivot defining a pivot axis extending substantially at 45° to the main axis for rotation of the monitor unit relative to the mounting arm about said pivot axis, thereby enabling a user to select between presentation to the user when present, of a monitor screen on said front side, controls for an audio system on said front side, controls for an audio system on said rear side, and the screen of a tablet computer docked in said slot on the rear side of the monitor unit, in each case in a selected one of portrait and landscape modes.

In a second aspect of the present disclosure, a vehicle entertainment system is adapted to be mounted to a vehicle, and comprises a mounting bracket adapted for coupling to one of a dashboard of a vehicle, a vehicle seat, its headrest if present, and mounting posts for such a headrest, and into an arm-rest for a vehicle seat; a mounting arm mounted for rotation relative to the mounting bracket about a main axis arranged in use to extend generally horizontally; a monitor unit, having a front side and a rear side, at least one of a monitor screen and controls for an audio system being provided on said front side, and the monitor unit being mounted to the mounting arm for rotation with the mounting arm about the main axis for adjustment of the angle of presentation of its front side to suit a user; the rear side of the monitor unit including a slot adapted for a tablet computer to dock therein both physically and electronically with the screen of the tablet computer exposed on the rear side of the monitor unit; and the monitor unit being coupled to the mounting arm by a pivot defining a pivot axis extending substantially at 45° to the main axis for rotation of the monitor unit relative to the mounting arm about said pivot axis, thereby enabling a user to select between presentation to the user of one of the at least one of a monitor screen and controls for an audio system on the front side of the monitor unit and the screen of a tablet computer docked in said slot on the rear side of the monitor unit, the tablet computer being presented in a selected one of portrait and landscape modes.

Preferred embodiments have one or more of the following features: The monitor unit and the mounting arm meet along a meeting plane which extends from the front side to the rear side of the monitor unit and with which the pivot axis is perpendicular, whereby the front side and rear side of the monitor unit, which are otherwise generally rectangular, have a cut-off corner portion. A side edge of the mounting arm to which the main axis is generally perpendicular is formed with a profile corresponding to edges of the monitor unit, whereby the monitor unit and the mounting arm present an effectively continuous surface on either side of the meeting plane.

BRIEF DESCRIPTION OF THE DRAWINGS

Reference may now be made to the description of preferred embodiments by way of example only with reference to the accompanying drawings, in which.

DESCRIPTION OF PREFERRED EMBODIMENTS

Figure 1:
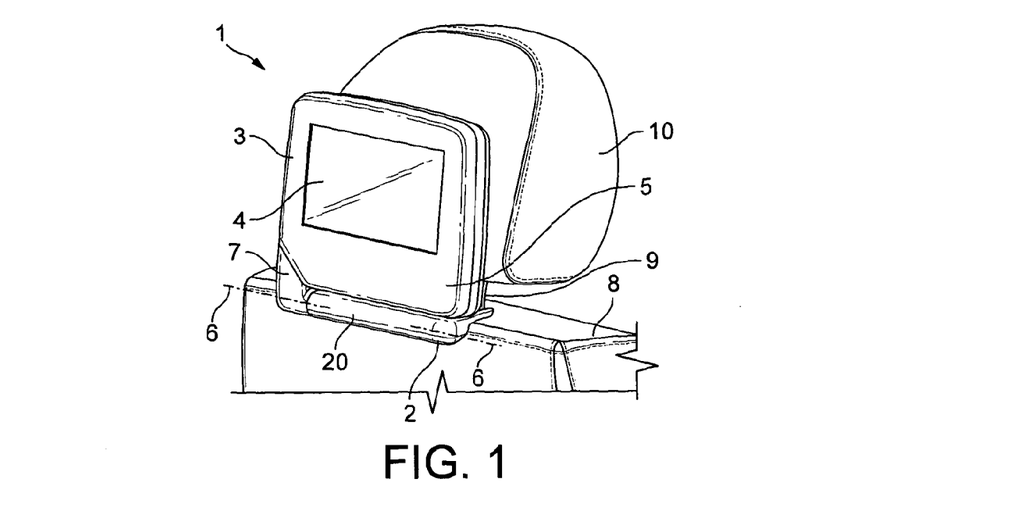
FIG. 1 is a perspective view showing a vehicle entertainment system mounted to the rear of a first seat of a motor vehicle, with a monitor screen presented for view on a front side of a monitor unit.

The vehicle entertainment system 1 illustrated in FIG. 1 appears superficially similar to conventional such systems for use by rear passengers of a motor vehicle, comprising a mounting bracket 2 and a monitor unit 3, with a monitor screen 4 on its front side 5, mounted from the bracket 2 so that it may pivot about a generally horizontal axis 6 to vary the angle of the screen 4 for users of different height. However, in this case, it will be noted that there is only a single mounting arm 7 at one axial end of horizontal axis 6 coupling the monitor unit 3 to bracket 2. The monitor unit 3 is shown in more detail in FIGS. 4 to 8, while the mounting arm is shown in more detail in FIGS. 9 to 12.

Figure 13:
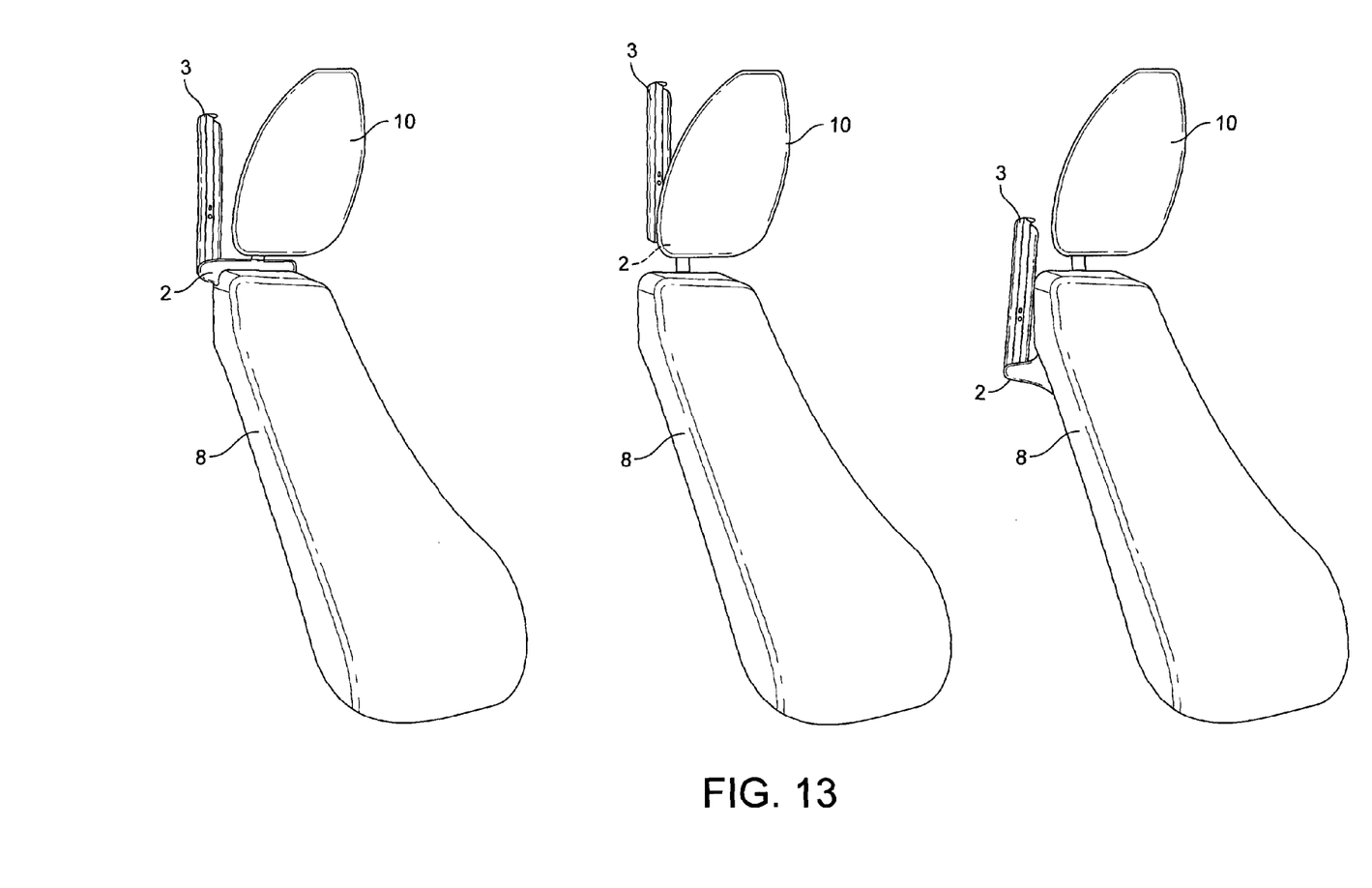
FIG. 13 shows three alternative mounting configurations for the vehicle entertainment system.

In this case, mounting bracket 2 is positioned atop the seat back 8 and suitably fastened between posts 9 for headrest 10 associated with seat hack 8 by use of the conventional headrest post restraint clips, as described in GB2438045 A of Incaar Ltd. However, the precise manner in which bracket 2 is mounted to the rear of the seat is of no consequence to the teachings of the present disclosure. Mounting bracket 2 may equally well be mounted in the seat back itself, in the headrest, or otherwise mounted to the back of the seat or to the back of the headrest or from posts mounting the headrest, as described in more detail hereinbelow, and including the three alternative positions illustrated in FIG. 13, namely atop the seat-back, within the headrest, and mounted from the seat-back proper.

Front side 5 of monitor unit 3 has a generally rectangular shape, although left and right sides 11 and 12 taper inwardly slightly towards top 13 of front side 5, which is slightly curved, all for stylistic reasons only. Front side 5 also has rounded corners 14, 15 and 16, again for stylistic reasons only. However, the remaining corner is cut off along a plane 17, best shown in FIG. 8, for a purpose to be explained. Screen 4 may be a conventional LCD or LED display.

Monitor unit 3 may be provided with internal battery power supply and electronic circuitry or coupled via mounting arm and mounting bracket or via connector jacks to an external power supply and/or external electronic circuitry, whereby the monitor is adapted to display or replay media files selected from TV, DVD, DVB-T, iPod, iPad, MP3, MP4, USB, HDMI, GPS, Blu-ray, 3G and 4G Mobile network streaming, Wi-fi and other forms of audio/visual media. These details are not of significance to the teachings of the present disclosure. Their provision will be within the normal skills of persons with knowledge of such systems. While not illustrated, since these details are also not of significance to the teachings of the present disclosure, the monitor unit may be provided with one or more control systems, such as remote control from a remote, for example via an Infra-red connection, by touch screen, by a separate touch panel provided on the front side of the monitor unit, or via conventional button matrix, which may be located on the monitor unit or on a control panel separately mounted within the vehicle and coupled by wiring to monitor unit 3. Audio play or playback may be provided via Infra-red connection or wired or wireless, such as Bluetooth or Kleer, connection to suitable headphones, or to an optional or originally fitted vehicle audio system. All of these technologies, some proprietary and requiring licence, are readily available commercially and well known to persons skilled in this field, so that no further description is deemed necessary.

Figure 9:
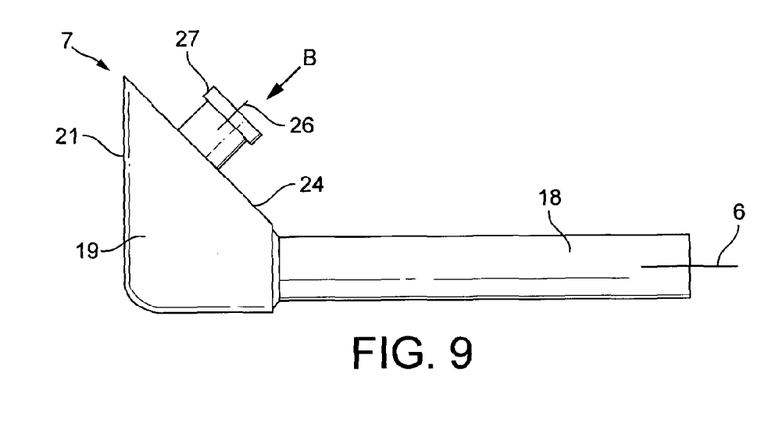
FIG. 9 is a generally schematic front elevational view of a mounting arm of the vehicle entertainment system shown in FIGS. 1 to 3.
Figure 10:
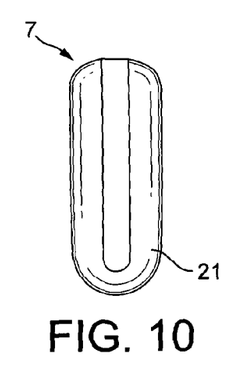
FIG. 10 is a side elevational view of the mounting arm of FIG. 9 as seen from the left in FIG. 9.
Figure 11:
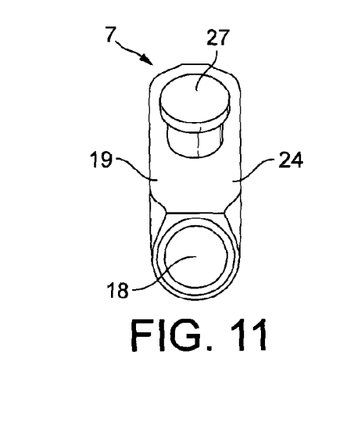
FIG. 11 is a side elevational view of the mounting arm of FIGS. 9 and 10 as seen from the right in FIG. 11.
Figure 12:
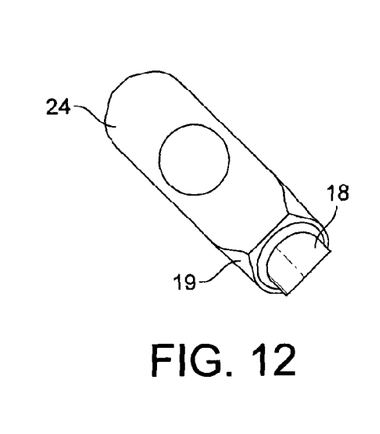
FIG. 12 is a scrap view as seen in the direction of the arrow B in FIG. 9.

Mounting arm 7 is mounted from mounting bracket 2 for rotation relative thereto about horizontal axis 6. This is represented in FIG. 9 schematically by a cylindrical rod 18 extending from body portion 19 of the mounting arm 7. In practice, rod 18 would be provided with grooves or lands cooperating with elements within hollow housing portion 20 of bracket 2 to form a hinge in which the rod 18 is captured within but rotatively mounted with respect to hollow housing portion 20 in the manner of a hinge. The precise manner by which such hinged connection is achieved is not important to the teachings of this disclosure.

Side edge 21 of body portion 19 of mounting arm 7 is profiled similarly to side edge 22 of the monitor unit 3 at the left side 11 of its front side and to bottom edge 23 of the monitor unit 3, and face 24 of body portion 19 matches surface 25 defined on monitor unit 3 by its corner cut off along plane 17. The monitor unit 3 is coupled to mounting arm 7 by a pivot defining a pivot axis 26 extending substantially at 45° to horizontal axis 6. This is schematically represented in the drawings by a headed pivot pin 27 upstanding from face 24 and a cooperating socket 28 formed in surface 25. It will be appreciated that the precise form of this pivotal connection may take various forms, provided that relative rotation of the monitor unit 3 about pivot axis 26 relative to mounting arm 7 is allowed through at least 180° and monitor unit 3 is not inadvertently detachable from mounting arm 7. As a result, monitor unit 3 is rotatable relative to mounting arm 7 to present to a user either its front side 5, as shown in FIG. 1, or its rear side 29 (FIGS. 2 and 3) for a purpose explained below.

Figure 2:
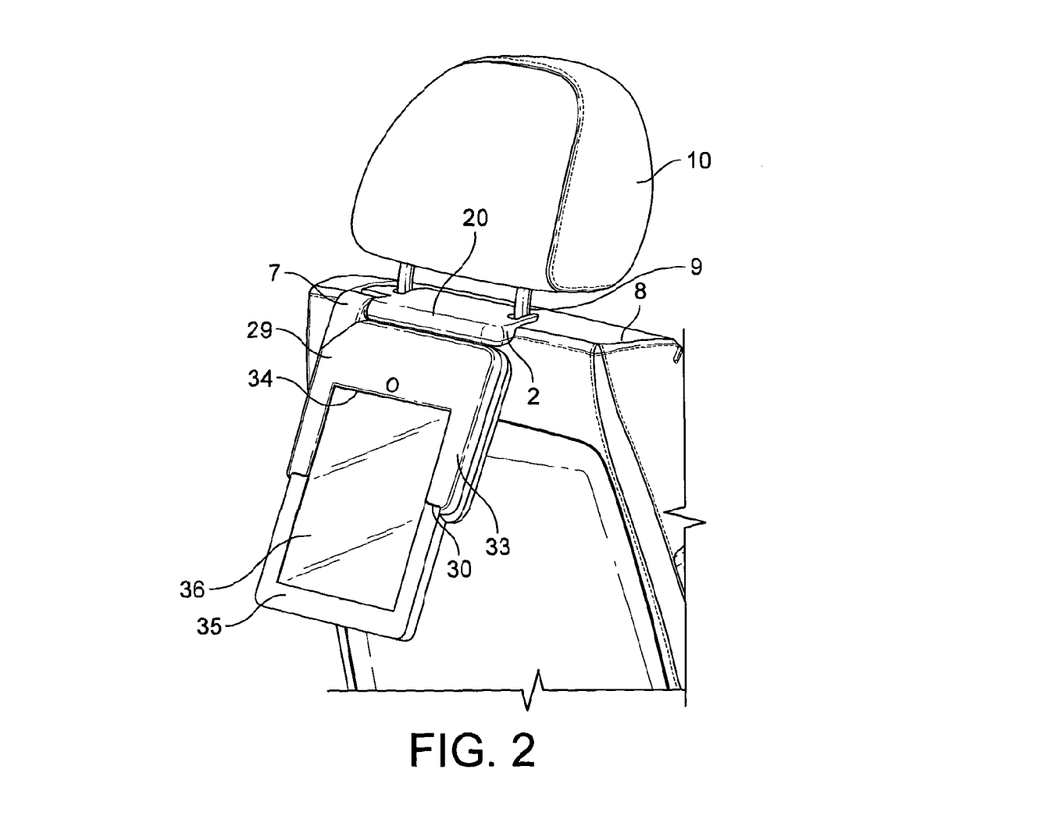
FIG. 2 is a view generally similar to FIG. 1, showing the vehicle entertainment system with a screen of a tablet computer docked in a slot defined in a rear side of the monitor unit presented in portrait mode for view.
Figure 3:
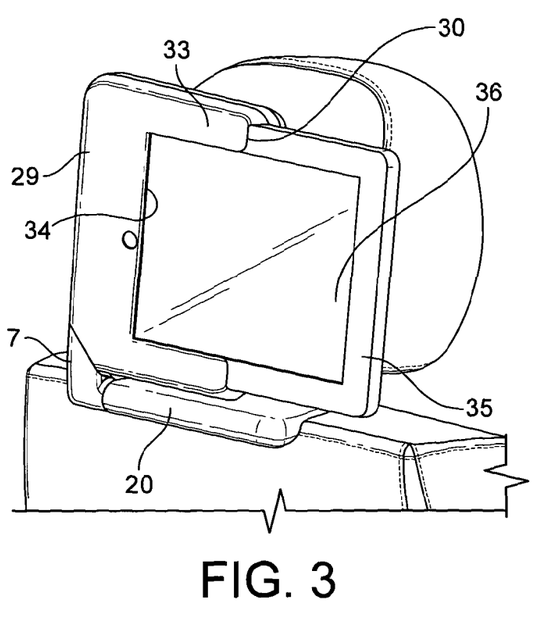
FIG. 3 is a view generally similar to FIG. 2, with the screen of the tablet computer presented in landscape mode.
Figure 4:
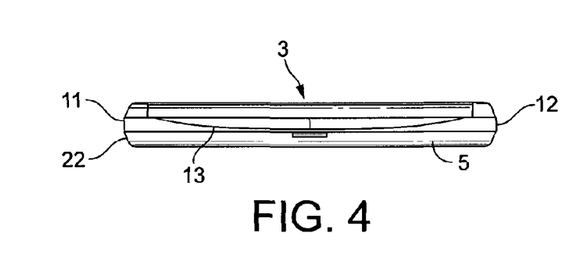
FIG. 4 is a top plan view of the monitor unit shown in FIGS. 1 to 3.
Figure 5:
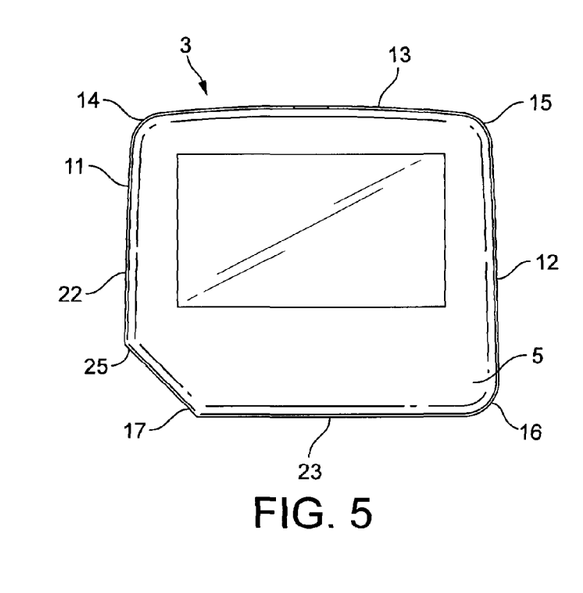
FIG. 5 is a front view of the monitor unit of FIG. 4.
Figures 6, 7, 8:
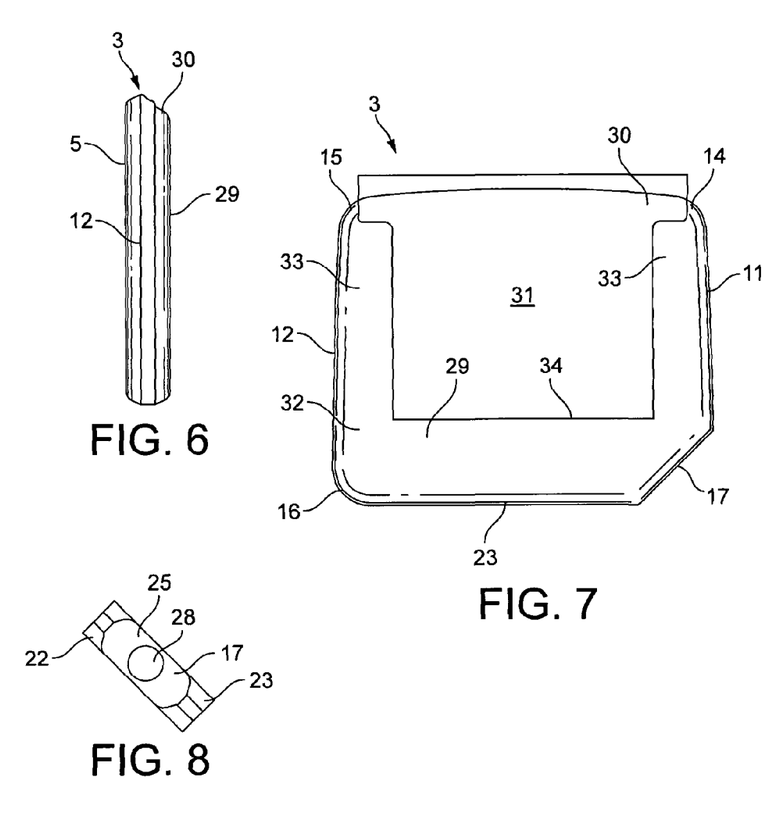
FIG. 6 is a side elevational view of the monitor unit of FIGS. 4 and 5, as seen from the right in FIG. 5.
FIG. 7 is a rear view of the monitor unit of FIGS. 4 to 6.
FIG. 8 is a scrap view of the monitor unit as seen in the direction of the arrow A in FIG. 5.

The monitor unit 3 illustrated has a plurality of structures enabling access to entertainment for a user. It has the monitor display 4 on front side 5. Rear side 29 of monitor unit 3 is also provided with a slot 30 open at and enterable from top 13 of the monitor. Slot 30 is defined between a first wall 31 behind the main part of monitor unit and an auxiliary wall 32 which is cut away to form flanges 33 along two side edges of the slot 30 and a trough 34 at the bottom of the slot. The slot is configured to receive a tablet computer 35, such as a tablet computer available under the iPad, Archos or Blackberry Trademarks, in physical and electronic docking relation, as best shown in FIGS. 2 and 3, with screen 36 of the tablet computer 35 presented in part in the cut away portion of auxiliary wall 32. Other structures enabling access to entertainment for a user are feasible, as will be explained below. Such structures may comprise controls for an audio system mounted either on the front or rear sides of the monitor unit. The teachings of this disclosure are equally applicable to entertainment apparatus with just one or with a plurality of such structures.

Starting with the monitor unit 3 positioned as shown in FIG. 1 in the conventional orientation for viewing the monitor screen, if the monitor unit and mounting arm are together pivoted downwardly about horizontal axis 6, rear side 29 of monitor unit 3 is brought into view and tablet computer 35 may be docked with the monitor unit by sliding lengthwise into slot 30 to present screen 36 of computer 35 in portrait mode, as shown in FIG. 2. From this position, simultaneous pivoting of monitor unit 3 through 180° relative to mounting arm 7 about pivot axis 26 and rotation of mounting arm 7 about horizontal axis 6 back up to its original position will present screen 36 of tablet computer 35 in landscape mode, as shown in FIG. 3.

Figure 14:
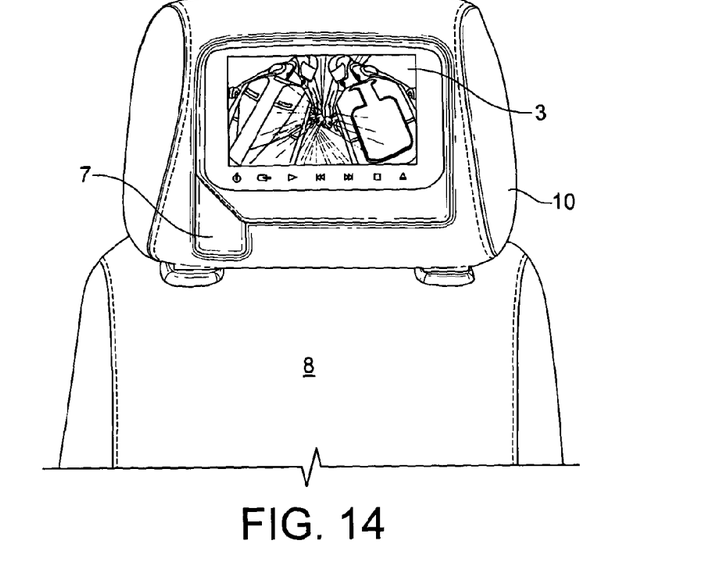
FIG. 14 shows a vehicle entertainment system mounted into the back of a headrest for a vehicle seat, with a monitor screen presented for view on a front side of a monitor unit.
Figure 15:
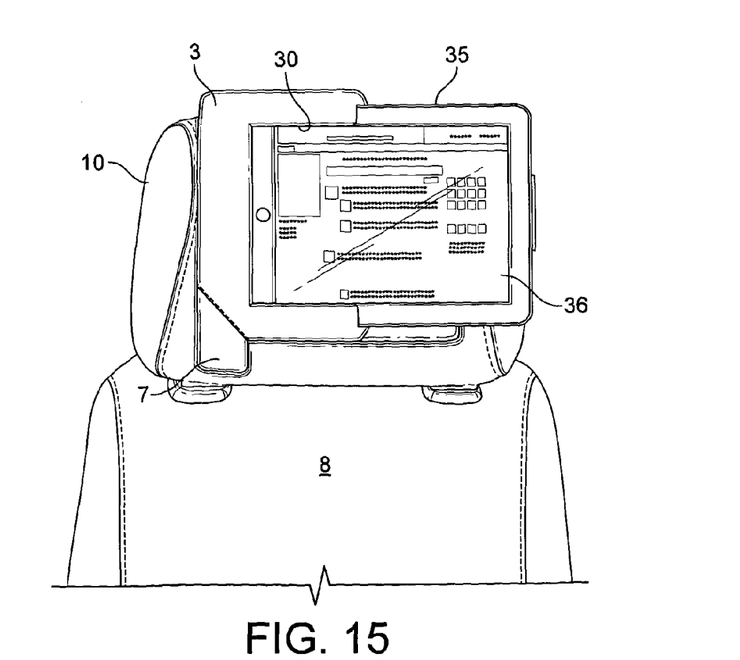
FIG. 15 is a view generally similar to FIG. 13, showing the vehicle entertainment system with a screen of a tablet computer docked in a slot defined in a rear side of the monitor unit presented in portrait mode for view.
Figure 16:
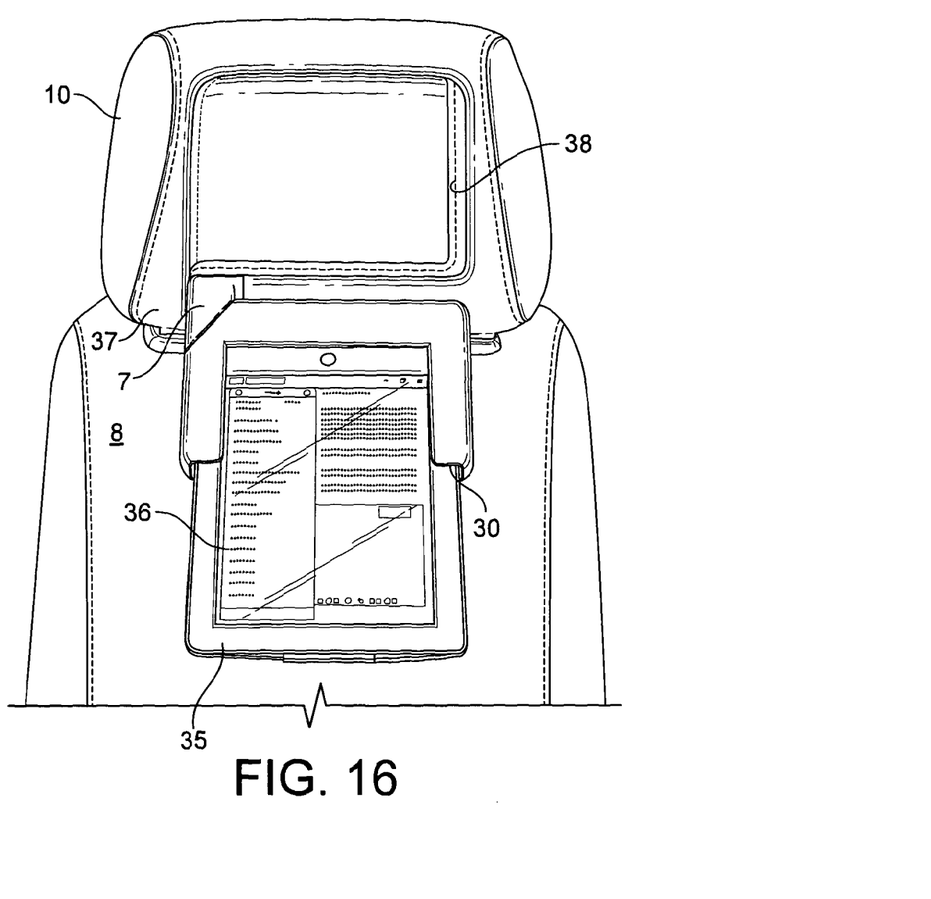
FIG. 16 is a view generally similar to FIG. 14, with the screen of the tablet computer presented in landscape mode.

FIGS. 14, 15 and 16 illustrate how a vehicle entertainment system of the kind described above with reference to FIGS. 1 to 12 may be incorporated within the volume of a vehicle headrest 10. Like reference numerals are used for like features to those of the previously described embodiment.

As best shown in FIG. 16, rear surface 37 of headrest 10 is sculpted to define a shallow well 38 to accommodate the monitor unit 3. Mounting bracket 2 is almost entirely accommodated within the headrest, and may be integrally moulded with internal support structure for the headrest. The vehicle seat including its headrest is here shown covered in leather. Surfaces of the mounting arm 7 and monitor unit 3 may be similarly covered. Since the hinged connection between the mounting arm 7 and mounting bracket 2, and the pivotal connection between the monitor unit 3 and mounting arm are all the same as for the previously described arrangements, and rear surface of monitor unit 3 includes slot 30 for tablet computer 35, as before, screen 36 of tablet computer 35 may be presented in landscape mode (FIG. 15) and in portrait mode (FIG. 16).

There is no reason why the system described hereinabove should be restricted to use by rear passengers of a vehicle, as will now be illustrated by reference to the embodiment shown in FIGS. 17, 18 and 19. Like reference numerals are again used for like features to those of previously described embodiments.

Figure 17:
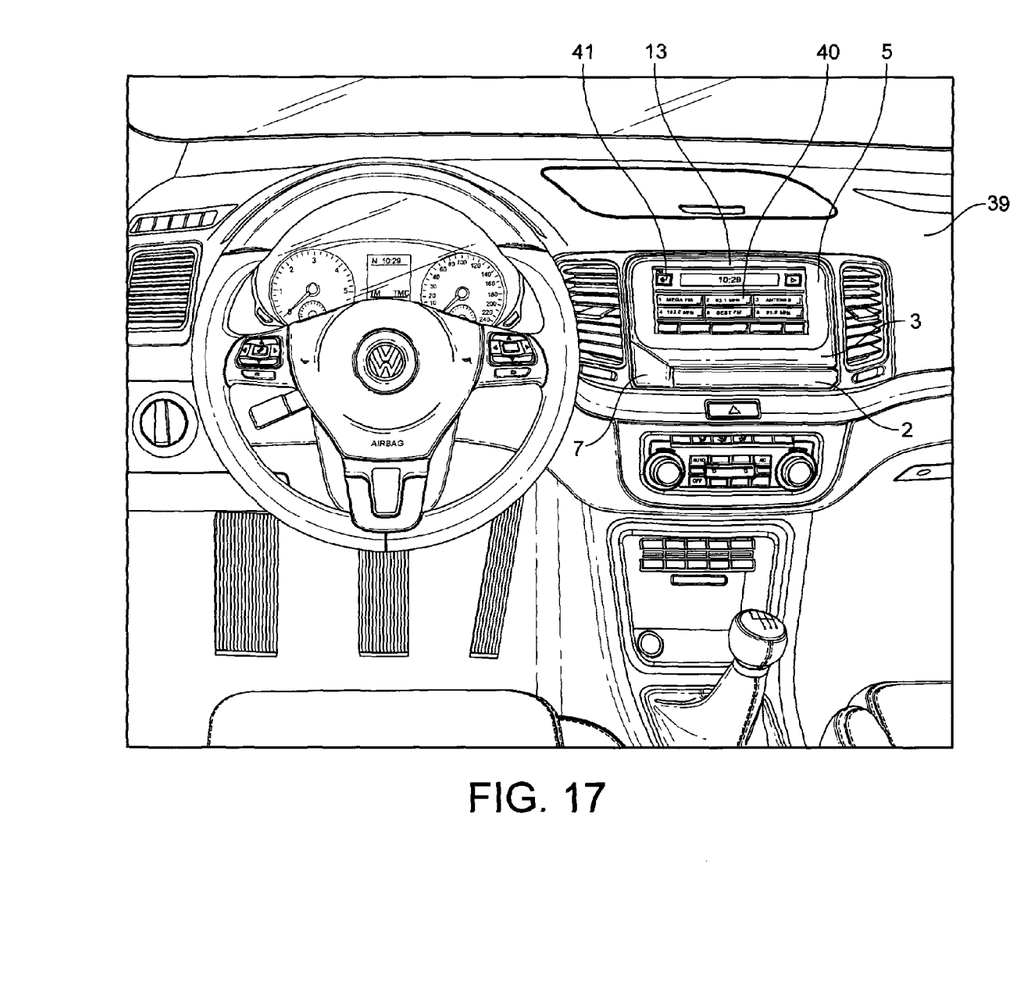
FIG. 17 shows a vehicle entertainment system mounted to the dashboard of a vehicle, with an touchscreen for control of an audio system presented for view on a front side of a monitor unit.
Figure 18:
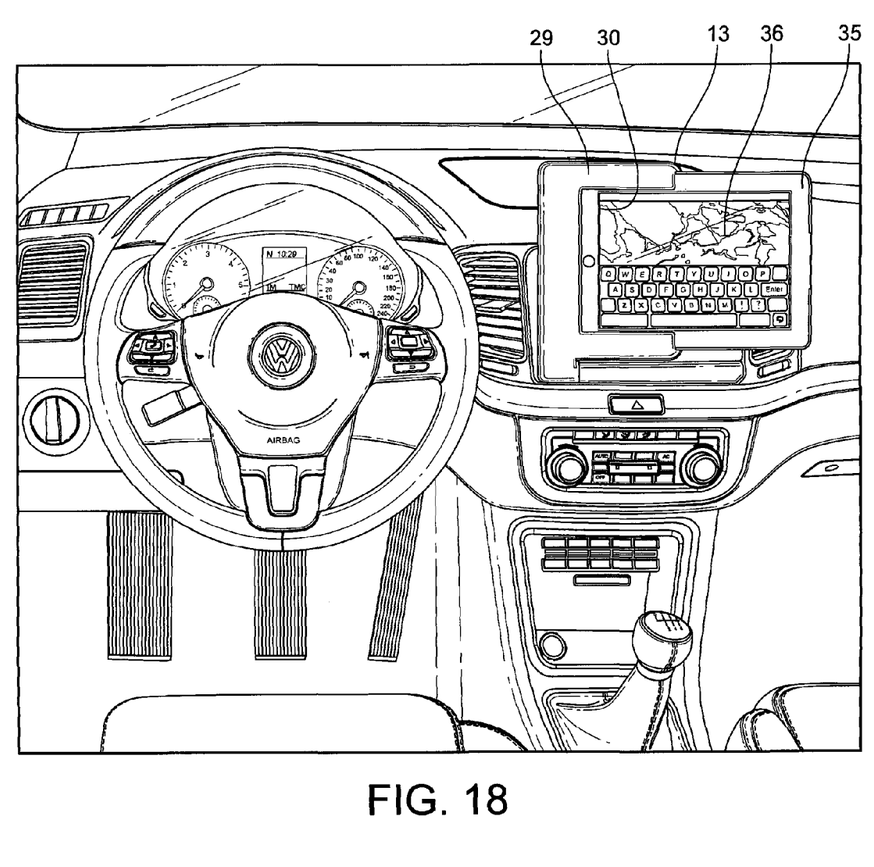
FIG. 18 is a view generally similar to FIG. 17, showing the vehicle entertainment system with a screen of a tablet computer docked in a slot defined in a rear side of the monitor unit presented in portrait mode for view.
Figure 19:
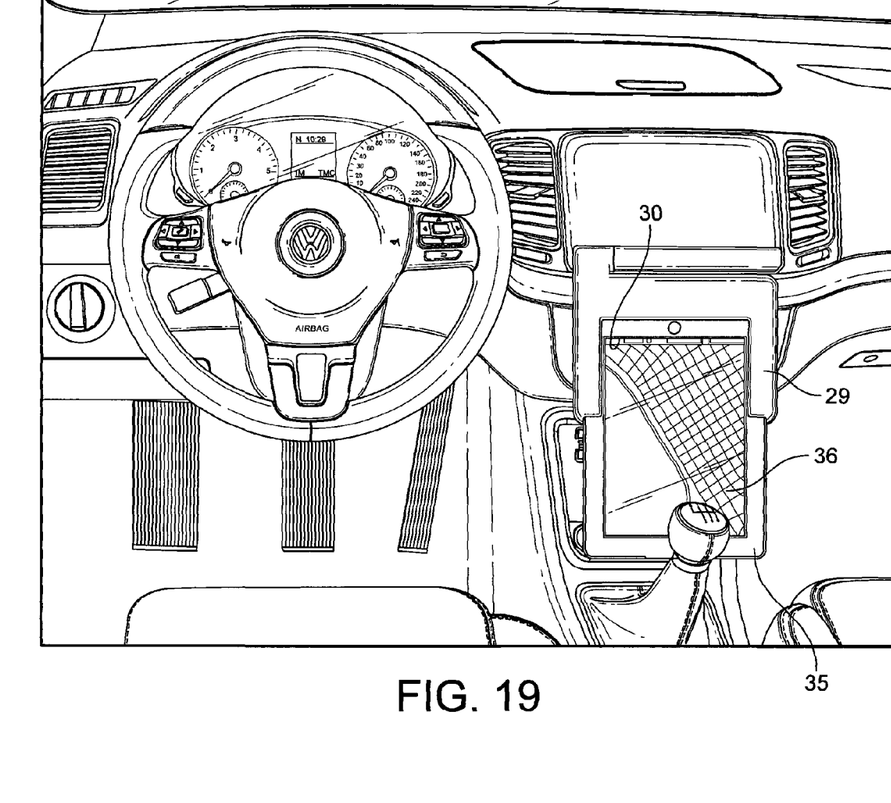
FIG. 19 is a view generally similar to FIG. 17, with the screen of the tablet computer presented in landscape mode.

As shown in FIGS. 17, 18 and 19, mounting bracket 2 is here mounted in and from dashboard 39 of the vehicle. Monitor unit 3 is coupled to bracket 2 by a mounting arm 7 in like manner to the first embodiment. However, front side 5 of monitor unit 3 here displays controls 40 for an audio system. The controls could include press buttons and/or dials, but preferably are provided in the form of a touch screen 41. Rear side 29 of monitor unit 3 again has a slot 30 open at and enterable from top 13 of the monitor unit for a tablet computer 35.

In exactly the same way as described above with reference to FIGS. 1 to 3, screen 36 of tablet computer 35 may be presented in landscape mode (FIG. 18) and in portrait mode (FIG. 19). Since tablet computers typically include a mapping system such as Google® maps or Google Earth® as a pre-loaded application, and present a far larger screen area than a conventional satellite navigation system, this system has the facility to provide a comprehensive and easily readable map for a driver or for a front-seat passenger acting as navigator.

Embodiments of vehicle entertainment systems in accordance with our teachings may be employed in vehicles other than motor cars (automobiles). Thus the embodiments previously described may readily be adapted for mounting in or from the seat back of a passenger ship, long distance coach transport, a railway carriage (car) or an aircraft.

Figure 20:
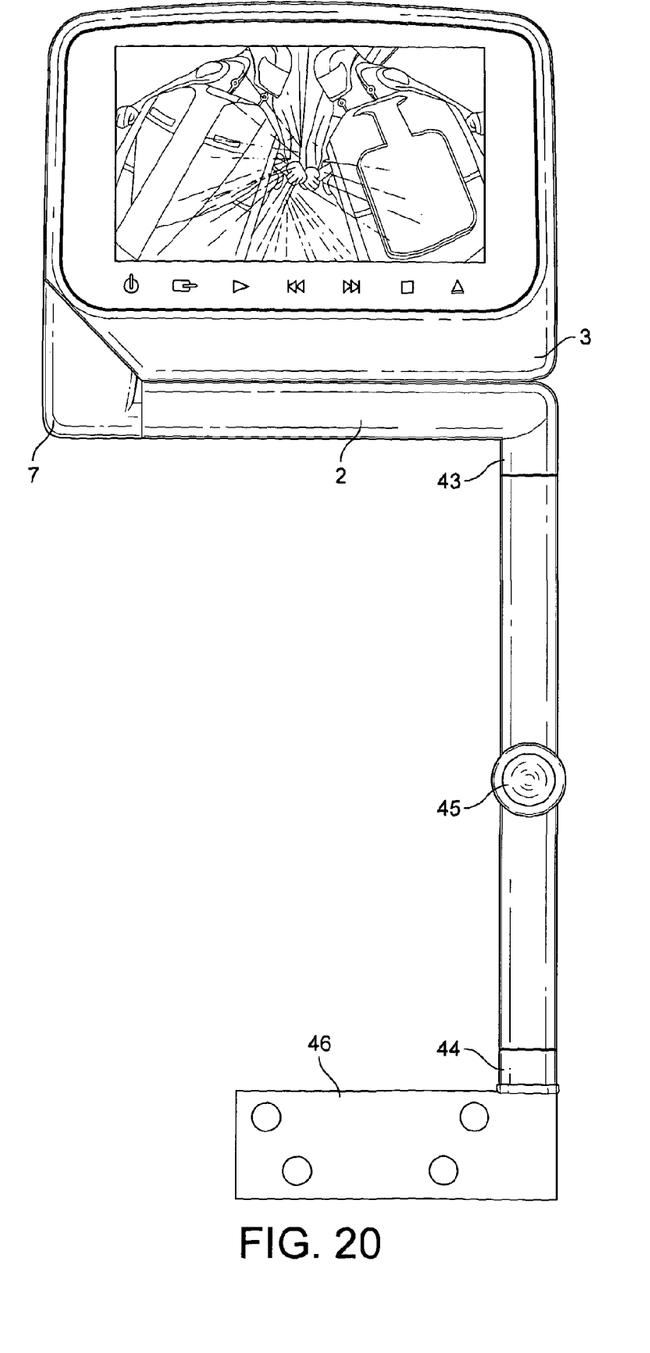
FIG. 20 shows a foldable structure to which the mounting bracket of a vehicle entertainment system is coupled to allow the system to be accommodated within an armrest of an aircraft seat.

They may also be adapted for use in an aircraft with vehicle entertainment systems that are stowed in the armrests of the aircraft seats. The only significant difference is that, in that case, the mounting bracket 2 will be mounted to or form part of a foldable structure 42, such as that shown in FIG. 20, allowing it to be stowed with the mounting arm and monitor unit within the armrest of the aircraft seat. As illustrated, foldable structure 42 has three hinges 43, 44 and 45, which together allow it to be folded in different planes, the structure being coupled to a mounting plate 46 which may be fitted to the aircraft seat or to the aircraft cabin floor.

Figure 21:
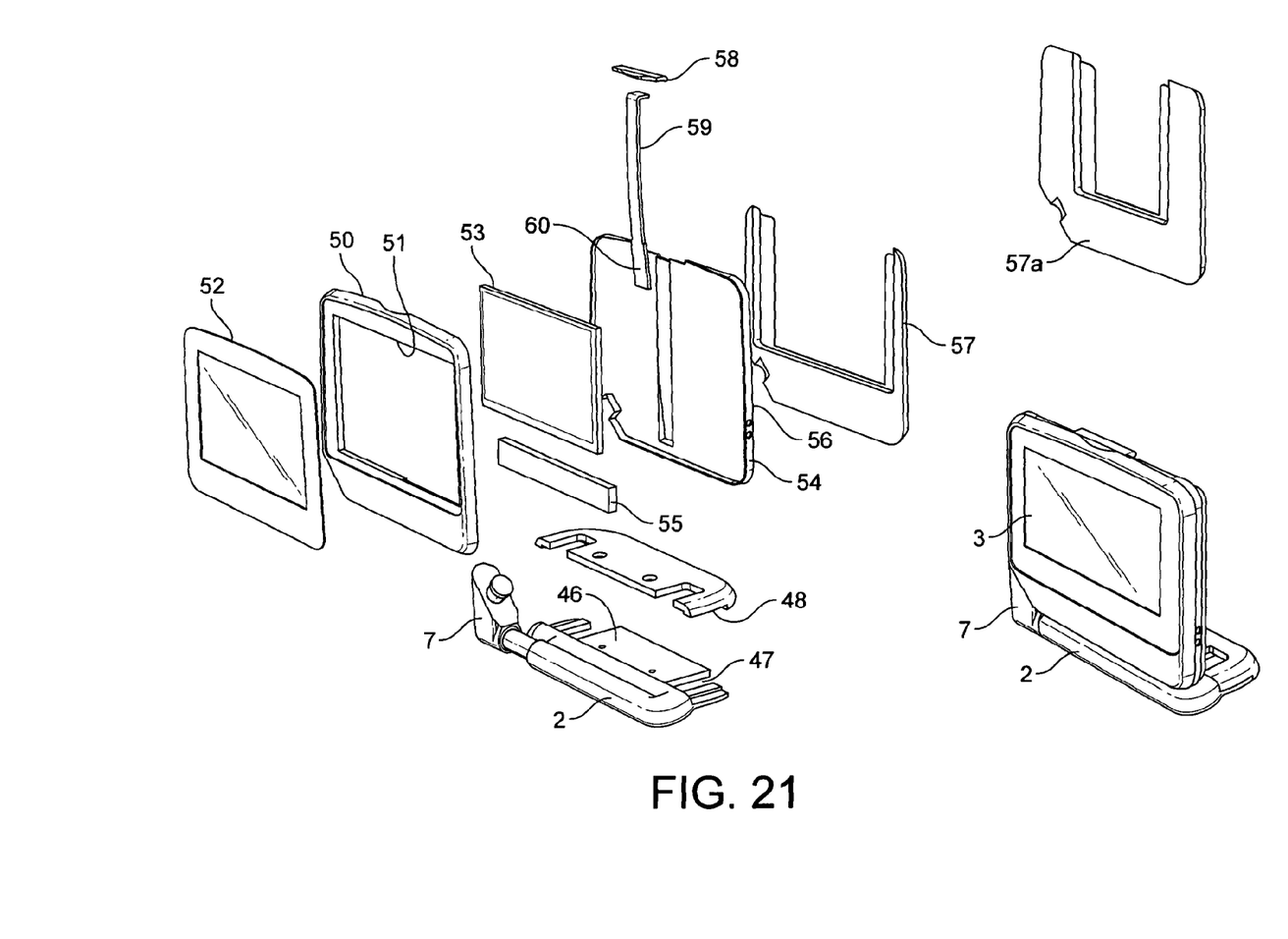
FIG. 21 is a combined perspective exploded view and assembled perspective view of an exemplary embodiment.

The combined exploded perspective view and perspective assembled view of FIG. 21 is provided to show how the system may readily be manufactured and assembled, and how it may readily be adapted for use with different embodiments of tablet computer.

The illustrated embodiment shown exploded is one adapted to sit atop the seat-back and to be held in place by conventional headrest post restraining clips in the manner described in GB2438045 A of Incaar Ltd, and so mounting bracket 2 incorporates an integral headrest attachment 46 with open slots 47 to allow the attachment 46 to fit around the headrest posts, and is provided with a separate headrest attachment clamp 48 with complementary slots 49. For other fixing locations, such the alternative headrest and seat-back locations shown in FIG. 13, the back portion of the mounting bracket will take a different form applicable to the mounting location. The precise details of such back portions are not of significance to the teachings of this disclosure.

Main body front plastics moulding 50 of monitor unit 3 has an opening 51 provided with a protective screen 52 to resist damage to LCD screen 53, illustrated schematically only, which is accommodated within the body of the unit in space defined between main body front moulding 50 and main body middle 54, which may be formed of metal or be a plastics moulding. This same space accommodates printed circuit board 55 mounting electronic circuitry for the monitor screen, here shown schematically only, and which suitably also supplies power to a tablet computer docked in slot 30 defined between rear wall 56 of main body middle 54 and main body rear plastics moulding 57. Details of the structure and wiring of a specific LCD screen and specific printed circuit board are of no relevance to the present teachings, which is why these components are merely illustrated schematically. The space defined between flanges 33 which define sides of slot 30 depends on the dimension of the screen of the tablet computer designed to be docked in the slot. Thus provision is suitably made for alternative main body rear plastics mouldings 57, 57a, ... and so on, for different popular tablet computers such as iPad®, Blackberry®, ... and so on. To prevent a docked tablet computer from inadvertently falling out of the slot, a retainer moulding 58 is mounted to the distal end of a spring retainer 59 that is mounted in turn at its proximal end 60 to the main body middle 54. As a tablet computer is inserted into the slot to dock therein, retainer moulding 58 may be pushed into the space between main body middle 54 and main body front moulding 50. However, the biasing effect of spring retainer 59 will cause retainer moulding 58 to bear against the rear surface of the inserted tablet computer to press it against flanges 33 to assist in retaining it within the slot. The fixings holding protective screen 52, mouldings 50 and 57 and main body middle 54 together are omitted from the drawing for clarity and ease of illustration.

The invention claimed is:

1. A vehicle entertainment system adapted to be mounted to a vehicle, and comprising a mounting bracket adapted for coupling to one of a dashboard of a vehicle, a vehicle seat, its headrest if present, and mounting posts for such a headrest, and into an arm-rest for a vehicle seat; a mounting arm mounted for rotation relative to the mounting bracket about a main axis arranged in use to extend generally horizontally; a monitor unit, having a front side and a rear side; the monitor unit having at least one structure enabling access to entertainment for a user, the structure being selected from the group comprising at least one of a monitor screen on said front side, controls for an audio system on said front side, controls for an audio system on said rear side, and a slot adapted for a tablet computer to dock therein both physically and electronically with the screen of the tablet computer exposed on the rear side; and the monitor unit being mounted to the mounting arm for rotation with the mounting arm about the main axis for adjustment of the angle of presentation of its front or rear side to suit a user; the monitor unit being coupled to the mounting arm by a pivot defining a pivot axis extending substantially at 45° to the main axis for rotation of the monitor unit relative to the mounting arm about said pivot axis, thereby enabling a user to select between presentation to the user when present, of a monitor screen on said front side, controls for an audio system on said front side, controls for an audio system on said rear side, and the screen of a tablet computer docked in said slot on the rear side of the monitor unit, in each case in a selected one of portrait and landscape modes.

2. A vehicle entertainment system adapted to be mounted to a vehicle, and comprises a mounting bracket adapted for coupling to one of a dashboard of a vehicle, a vehicle seat, its headrest if present, and mounting posts for such a headrest, and into an arm-rest for a vehicle seat; a mounting arm mounted for rotation relative to the mounting bracket about a main axis arranged in use to extend generally horizontally; a monitor unit, having a front side and a rear side, at least one of a monitor screen and controls for an audio system being provided on said front side, and the monitor unit being mounted to the mounting arm for rotation with the mounting arm about the main axis for adjustment of the angle of presentation of its front side to suit a user; the rear side of the monitor unit including a slot adapted for a tablet computer to dock therein both physically and electronically with the screen of the tablet computer exposed on the rear side of the monitor unit; and the monitor unit being coupled to the mounting arm by a pivot defining a pivot axis extending substantially at 45° to the main axis for rotation of the monitor unit relative to the mounting arm about said pivot axis, thereby enabling a user to select between presentation to the user of one of the at least one of a monitor screen and controls for an audio system on the front side of the monitor unit and the screen of a tablet computer docked in said slot on the rear side of the monitor unit, the tablet computer being presented in a selected one of portrait and landscape modes.

3. A vehicle entertainment system according to claim 1, wherein the slot is defined between a rear wall of the monitor proper and an auxiliary wall rearwardly of the rear wall and defining the slot between the rear wall proper and the auxiliary wall, a central portion of the auxiliary wall being cut away to allow the whole of the screen of the tablet computer to be visible not withstanding that edge regions of the tablet computer alongside its screen are obscured by portions of the auxiliary wall.

4. A vehicle entertainment system according to claim 3, wherein the auxiliary wall is defined by a plastics moulding defining said cut away portion and the distance between sides of the slot to fit a specific make or model of tablet computer, the plastics moulding being adapted for selective exchange to adapt the vehicle entertainment system for different tablet computers.

5. A vehicle entertainment system according to claim 1, provided with a spring loaded retainer adapted to engage a protruding edge of a tablet computer received in said slot to resist the tablet computer inadvertently disengaging from the slot.

6. A vehicle entertainment system according to claim 1, wherein the monitor unit and the mounting arm meet along a meeting plane which extends from the front side to the rear side of the monitor unit and with which the pivot axis is perpendicular.

7. A vehicle entertainment system according to claim 6, wherein the front side and rear side of the monitor unit are generally rectangular apart from a cut-off corner portion at the meeting plane.

8. A vehicle entertainment system according to claim 7, wherein a side edge of the mounting arm to which the main axis is generally perpendicular is formed with a profile corresponding to edges of the monitor unit, whereby the monitor unit and the mounting arm present an effectively continuous surface on either side of the meeting plane.

\* \* \* \* \*